(12) United States Patent
Jin et al.

(10) Patent No.: US 7,308,042 B2
(45) Date of Patent: Dec. 11, 2007

(54) METHOD AND APPARATUS FOR OPTIMIZING TRANSMITTER POWER EFFICIENCY

(75) Inventors: Xin Jin, Ottawa (CA); Qingzhong Jiao, Nepean (CA); Wen Chan, Thornhill (CA)

(73) Assignee: Research In Motion Limited, Waterloo, Ontario (CA)

( * ) Notice: Subject to any disclaimer, the term of this patent is extended or adjusted under 35 U.S.C. 154(b) by 723 days.

(21) Appl. No.: 10/787,097

(22) Filed: Feb. 27, 2004

(65) Prior Publication Data

US 2005/0190855 A1    Sep. 1, 2005

(51) Int. Cl.
H04L 25/03 (2006.01)

(52) U.S. Cl. ............ 375/297
(58) Field of Classification Search ........ 375/297, 375/345, 295; 330/10, 136; 455/127.1
See application file for complete search history.

(56) References Cited

U.S. PATENT DOCUMENTS

| | | |
|---|---|---|
| 5,267,262 A | 11/1993 | Wheatley, III |
| 5,485,486 A | 1/1996 | Gilhousen et al. |
| 6,107,878 A | 8/2000 | Black |
| 6,137,840 A | 10/2000 | Tiedemann, Jr. et al. |
| 6,178,383 B1 | 1/2001 | Pegram et al. |
| 6,208,202 B1 | 3/2001 | Kaufman et al. |
| 6,313,698 B1 | 11/2001 | Zhang et al. |
| 6,373,823 B1 | 4/2002 | Chen et al. |
| 6,421,327 B1 | 7/2002 | Lundby et al. |
| 6,445,247 B1 | 9/2002 | Walker |
| 6,531,860 B1 | 3/2003 | Zhou et al. |
| 6,535,066 B1 | 3/2003 | Petsko |
| 2005/0186923 A1* | 8/2005 | Chen et al. ............ 455/127.1 |

FOREIGN PATENT DOCUMENTS

| | | |
|---|---|---|
| WO | WO 02/33844 | 4/2002 |
| WO | WO 02/060088 | 8/2002 |

* cited by examiner

Primary Examiner—Khai Tran

(57) ABSTRACT

The power efficiency of a transmitter is optimized through control of a selected aspect of the transmitter, for instance, a parameter of a power amplifier within the transmitter. The control of the aspect is based on a generated indication of desired average transmitted power. Based on this indication, a hardware path produces a first adjustment signal and a software path produces a second adjustment value, where the second adjustment value has been previously determined to correspond to the particular indication of desired average transmitted power through calibration. A difference between a first adjustment value, which is based on the first adjustment signal, and the second adjustment value is used to produce a correction signal, which is used to alter the first adjustment signal and produce a signal to control the selected aspect of the transmitter.

20 Claims, 7 Drawing Sheets

METHOD AND APPARATUS FOR OPTIMIZING TRANSMITTER POWER EFFICIENCY

FIELD OF THE INVENTION

The present invention relates to power efficiency in wireless transmitters and, in particular, to a method and apparatus for optimizing transmitter power efficiency.

BACKGROUND

Battery life or power efficiency is a major performance criterion for wireless communication devices and many other types of wireless transmitters. Power efficiency has become more important as wireless communication devices move into the provision of multimedia services, which consume much more power than traditional voice services. Improving the efficiency of the transmitter component of wireless communication devices plays an important role in improving the performance of such devices.

In one aspect of the need for improved power efficiency, such new modulation methods as Code Division Multiple Access (CDMA), Orthogonal Frequency Division Multiplexing (OFDM) and other types of multi-carrier modulations, and combinations thereof, exhibit high peak to average power ratios (PAPR) in the transmitted power. Additionally, the PAPR changes with time, depending on a transmission data format configuration. Such high and variable PAPR values require the transmitter (including the power amplifier) to provide large dynamic range and good linearity.

In another aspect of the need for improved power efficiency, in many communication standards, such as cdma2000, 1×EV-DO (1× Evolution Data Only), 1×EV-DV (1× Evolution Data and Voice) and Universal Mobile Telecommunications Service (UMTS), the transmitted power is required to be controlled to vary in a large range, e.g., from lower than −50 dBm to higher than 23 dBm for cdma2000 devices. Furthermore, the speed of power, and PAPR, variation is also very fast. For example, in cdma2000, the speed of power variation is up to 800 dB per second and the PAPR may vary every 20 ms. It is challenging to design a transmitter to work well in all such conditions without sacrificing efficiency in power consumption.

In some known methods to improve transmitter efficiency in varying transmit power and/or varying PAPR transmitters, the transmitter circuits provide one or more control ports to control certain parameters within the transmitter circuits in continuous fashion and/or in digital fashion. The parameters in the transmitter circuits can be any physical quantities that can be used to trade for efficiency at a given condition.

The control ports can control parameters including (but not limited to) bias, power supply voltage, switch in or switch out stages and combinations of these. In particular, the bias to each or some of the amplifying devices inside a power amplifier may be controlled. The objective is to control the bias to an amount no more than necessary to limit out of band spurious emissions as stated by a predetermined requirement and maintain waveform quality for each given transmitted power and/or PAPR values in a supported range. The power supply voltages to all or selected stages of power amplifier and/or other circuits in transmitter may be controlled such that voltage is supplied to the circuits (at least in part) by non-resistive voltage regulating means (e.g., s switching power supply) to obtain the benefit of power saving. The objective is to control the voltage no more than necessary to limit out of band spurious emissions as stated by a predetermined requirement and maintain waveform quality for each given transmitted power and/or PAPR value in the supported range. As well, selected stages may be switched in or out according to the transmitted power and/or PAPR values.

Despite the advances represented by these earlier methods, the optimization of transmitter power efficiency continues to attract significant attention.

SUMMARY

In a method and apparatus for optimizing transmitter power efficiency, a fast approximate adjustment of a transmitter parameter that is implemented in hardware is combined with a feedback correction adjustment of the transmitter parameter, where the feedback correction adjustment is implemented in software. The software-based feedback correction adjustment is slower than the hardware-based fast approximate adjustment, but is more accurate.

In accordance with an aspect of the present invention there is provided an efficiency optimizing apparatus for optimizing power efficiency in a transmitter. The efficiency optimizing apparatus includes a transmit power generator operable to produce an indication of desired average transmitted power, a signal converter operable to produce a first adjustment signal based, at least in part, on the indication of desired average transmitted power, a processor and a summer. The processor is operable to produce a second adjustment signal based, at least in part, on the indication of desired average transmitted power, determine a difference between the first adjustment signal and the second adjustment signal and produce a correction value based on the difference. The summer is operable to produce a parameter signal, based on the correction value and the first adjustment signal, to control an aspect of operation of the transmitter.

In accordance with another aspect of the present invention there is provided a method of optimizing power efficiency in a transmitter. The method includes generating an indication of desired average transmitted power, producing a first adjustment signal based on the indication of desired average transmitted power, producing a second adjustment value based on the indication of desired average transmitted power, determining a difference between a first adjustment value based on the first adjustment signal and the second adjustment value, producing a correction value based on the difference and producing a parameter signal to control an aspect of operation of the transmitter based on the correction value and the first adjustment signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
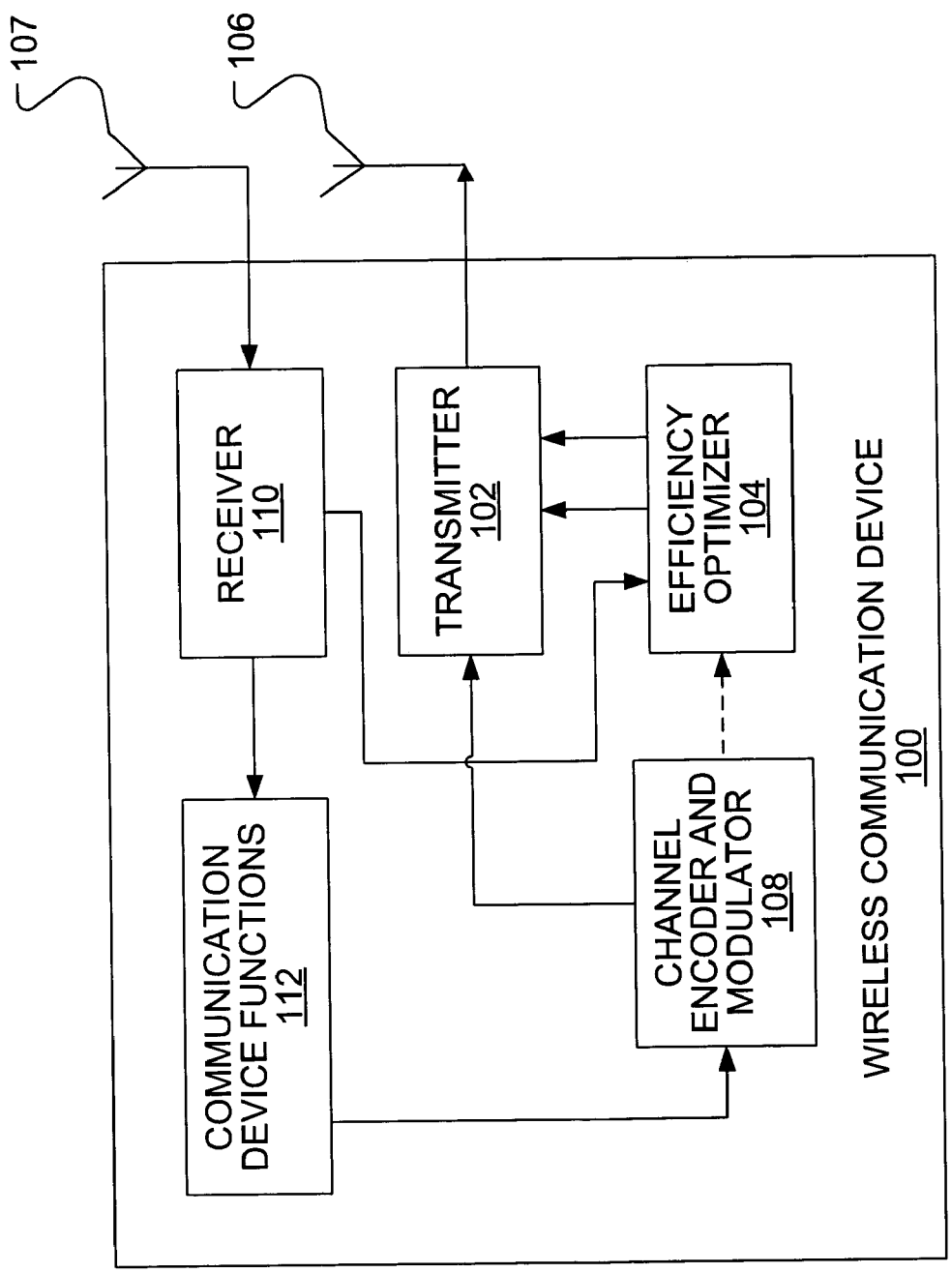
FIG. 1 illustrates a wireless communication device for which aspects of the present invention may be employed.

A block diagram of a wireless communication device 100 is illustrated in FIG. 1 to include a transmitter 102, a receiver 110 and one or more antennas 106, 107. Additionally, a transmitter power efficiency optimizer 104 provides input to the transmitter 102 for optimizing the power efficiency of the transmitter 102. The main output of the receiver 110 is received for use by communication device functions 112 that may include, for example, voice or data applications but, since such functions are not closely related to the present application, further detail has been omitted. A secondary output of the receiver 110 is received for use by the transmitter power efficiency optimizer 104 as will be described hereinafter. A channel encoder and modulator 108 may receive a signal from the communications device functions 112, may provide the transmitter 102 with a signal to transmit and may provide, to the transmitter power efficiency optimizer 104, an indication of a data format of the signal provided to the transmitter 102. It should be understood by a person skilled in the art that many major components of the wireless communication device 100 in FIG. 1 have been omitted for clarity of illustration.

The specific design and implementation of the wireless communication device 100 is dependent upon the communication network in which the wireless communication device 100 is intended to operate. For example, the wireless communication device 100 may be designed to operate with the Mobitex™, DataTAC™ or General Packet Radio Service (GPRS) mobile data communication networks and also designed to operate with any of a variety of voice communication networks, such as AMPS, TDMA, CDMA, PCS, GSM, UMTS, etc. Other types of data and voice networks, both separate and integrated, may also be utilized with the wireless communication device 100.

Figure 2:
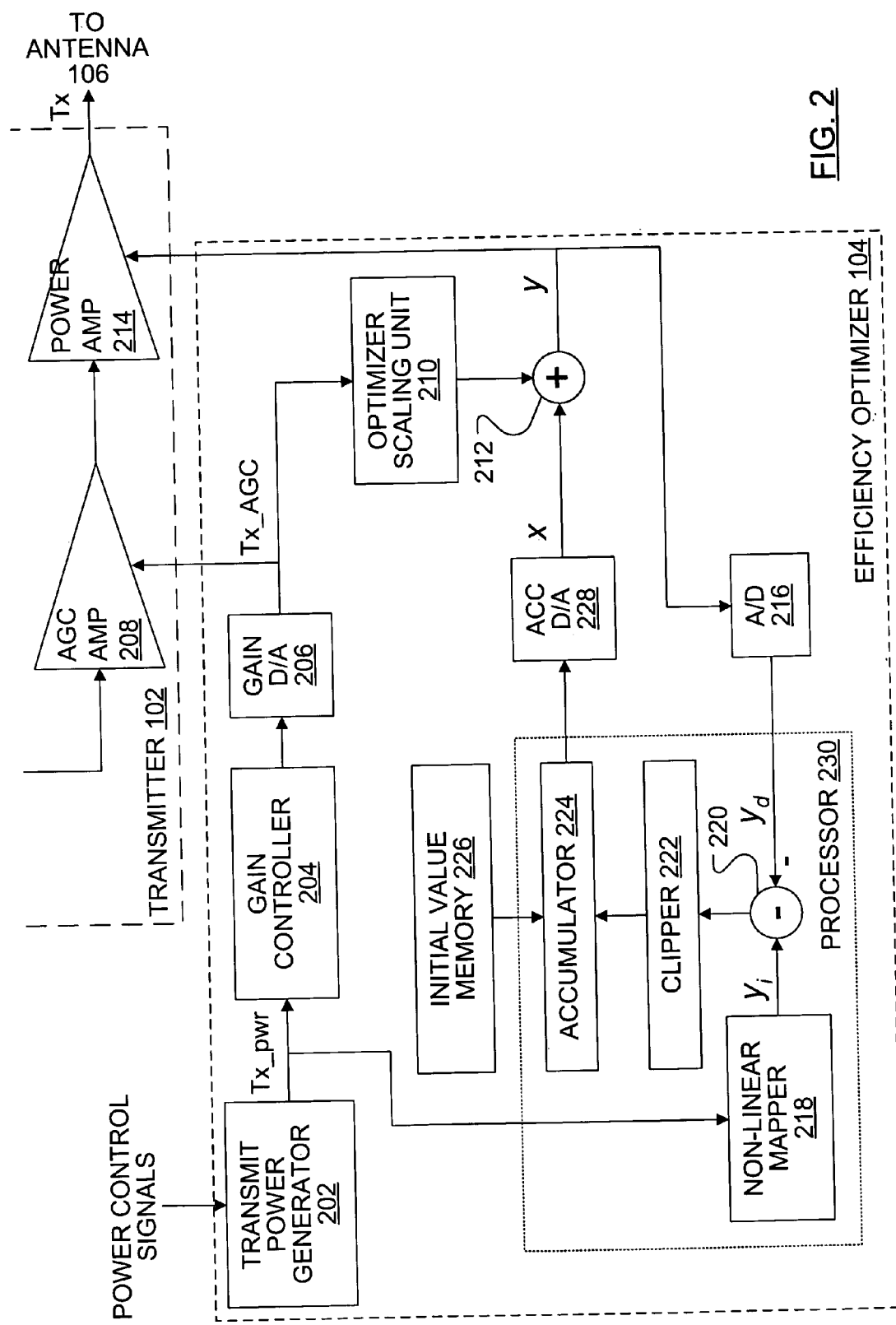
FIG. 2 illustrates an apparatus for optimizing transmitter power efficiency employing an optimizer scaling unit according to a first embodiment of the present invention.

FIG. 2 illustrates the efficiency optimizer 104 in detail along with a portion of the transmitter 102. In particular, the transmitter 102 is shown to include an AGC amplifier 208 whose output is received by a power amplifier 214 whose output, in turn, is received by the antenna 106 (FIG. 1). As part of the efficiency optimizer 104, a transmit power generator 202 receives power control signals from the receiver 110. The power control signals may include closed loop power control instructions from a base station and a received signal strength indicator (RSSI) signal for open loop power control, and may further include a pilot strength to interference ratio signal also for open loop power control. Based, at least in part, on the power control signals, the transmit power generator 202 then provides a desired average transmitted power value "Tx_pwr" (in dBm or units proportional to power in dBm) that is expected at the antenna 106.

The Tx_pwr value is provided by the transmit power generator 202 to a gain controller 204. The output of the gain controller 204 is converted from digital to analog by a gain D/A converter 206 and then provided to the AGC amplifier 208 of the transmitter 102. The output of the gain D/A converter 206 is also provided to a signal converter, which converts the signal provided to the AGC amplifier 208 to an adjustment signal that is an approximation of a signal that may be used to control a parameter of the power amplifier 214. In the embodiment of FIG. 2, the signal converter is an optimizer scaling unit 210. The scaling factor, S, of the optimizer scaling unit 210 is determined in a design phase described hereinafter in conjunction with FIG. 7.

The parameter of the power amplifier 214 controlled by the efficiency optimizer 104 may be, but is not limit to, dynamic range, gain, bias or quiescent current, conduction angle, power supply voltage, a charging duty cycle, a load, or an impedance.

The output of the optimizer scaling unit 210 is summed with a correction signal, "x" (to be described hereinafter), at an adjustment signal summer 212, whose output signal, a power amplifier parameter signal referred to herein as "y", is received by the power amplifier 214 and/or other parts (not shown) of the transmitter 102. Such other parts of the transmitter 102 may include, for example, a switch power supply for the power amplifier 214. Additionally, the power amplifier parameter signal y is converted from an analog signal to a digital signal, "$y_d$", by an A/D converter 216.

A nonlinear mapper 218 stores a mapping table containing desired values of $y_d$ as a function of Tx_pwr, marked as $y_i$ in the figure. Given a value for Tx_pwr from the transmit power generator 202, the nonlinear mapper 218 determines, and outputs, $y_i$, a desired value for $y_d$. A difference between $y_i$ and the value of $y_d$ supplied by the A/D converter 216 is determined by a subtracter 220.

The difference may be limited by a clipper 222 such that, at the output of the clipper 222, a limited value of the difference does not exceed a limit value $D_{max}$. The limited value of the difference is provided to an accumulator 224 whose digital output is converted to an analog correction signal x by an ACC D/A converter 228.

At the time the transmitter 102 is just turned on, the first output value of the accumulator is an "initial value" that is predetermined as a constant that can be stored in an initial value memory 226.

Figure 3:
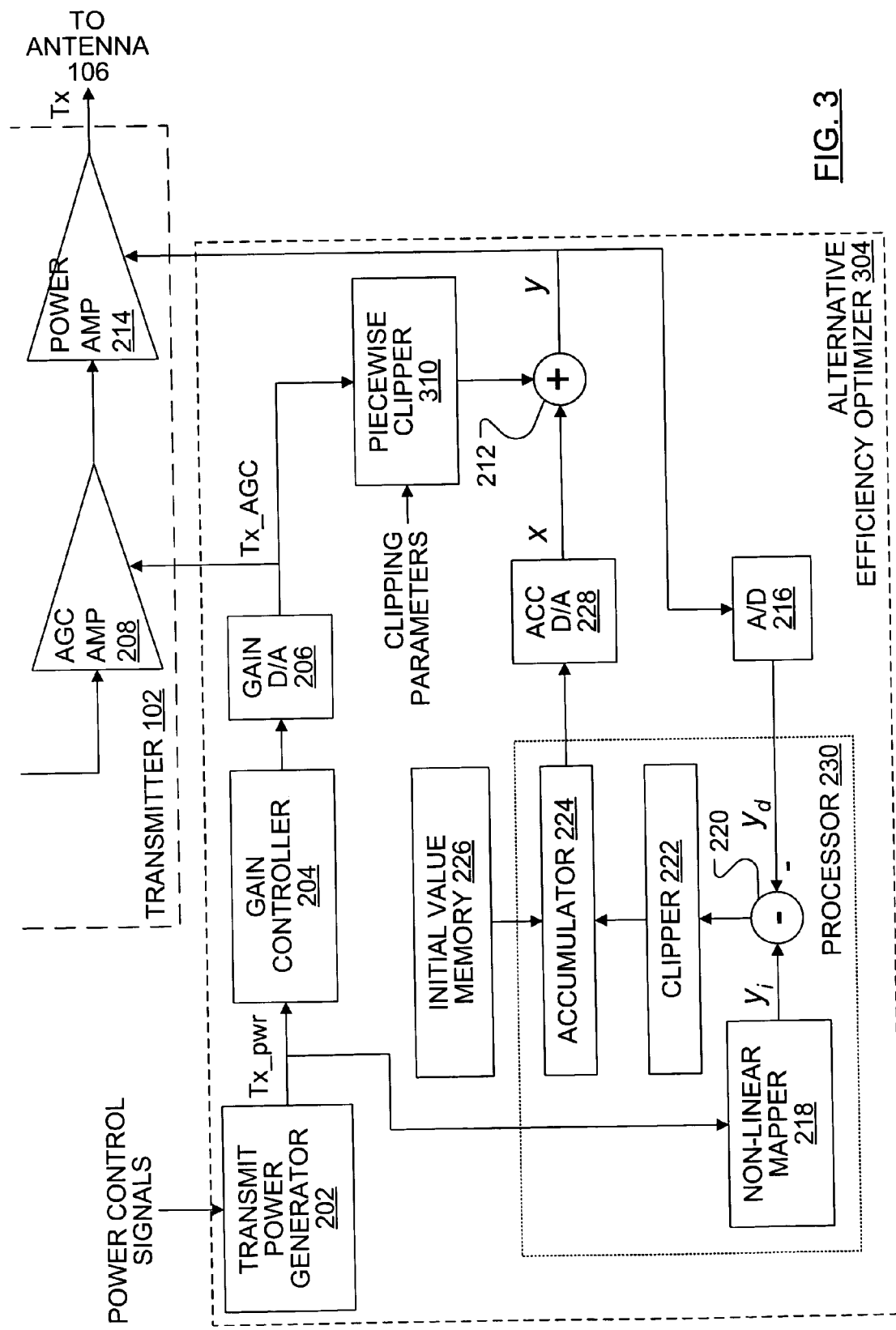
FIG. 3 illustrates an apparatus for optimizing transmitter power efficiency employing a piecewise clipper according to a second embodiment of the present invention.

FIG. 3 illustrates an alternative efficiency optimizer 304, wherein the signal converter is a piecewise clipper 310. As such, the output of the gain D/A converter 206 in the alternative efficiency optimizer 304 is provided to the piecewise clipper 310 and the output of the piecewise clipper 310 is summed with the correction signal x at the adjustment signal summer 212 to create the power amplifier parameter signal y that is received by the power amplifier 214 of the transmitter 102. The piecewise clipper 310 has parameters that can either be predetermined and fixed, or programmable by a microprocessor or controller (not shown) in the wireless communication device 100. In the former case, the parameters are optimized and determined in the design stage of the wireless communication device 100. In the latter case, the parameters can be programmed real-time in response to such working varying conditions as operating temperature of the transmitter 102, battery parameters of the battery (not shown) that powers that transmitter 102, transmitting frequency of the transmitter 102, and/or the indication of a data format of the signal provided by channel encoder and modulator 108 (as shown in FIG. 1).

Figure 4:
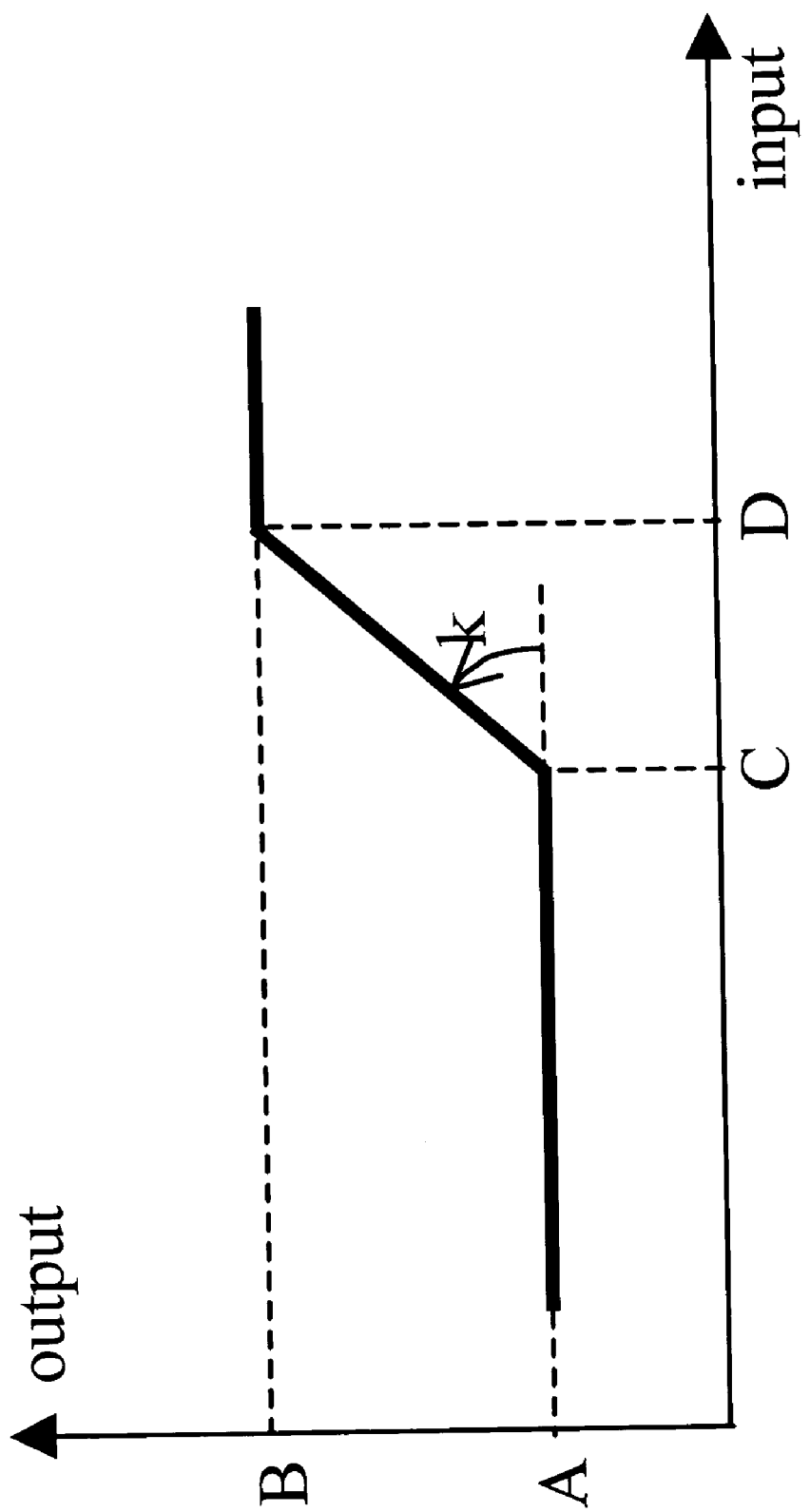
FIG. 4 illustrates a piecewise clipper transfer function for use in the apparatus of FIG. 3 according to an embodiment of the present invention.

FIG. 4 shows an exemplary input to output transfer function of the piecewise clipper 310. As shown, if the piecewise clipper 310 is programmable, the programmable parameters may include the lower clipping level A, the upper clipping level B, the lower knee point C, the upper knee point D, and/or the slope of ramping k (not all these parameters are independent). Other piecewise arrangement may also be used as appropriate. The detailed implementation is well known to those skilled in the art and therefore is not described.

Figure 5:
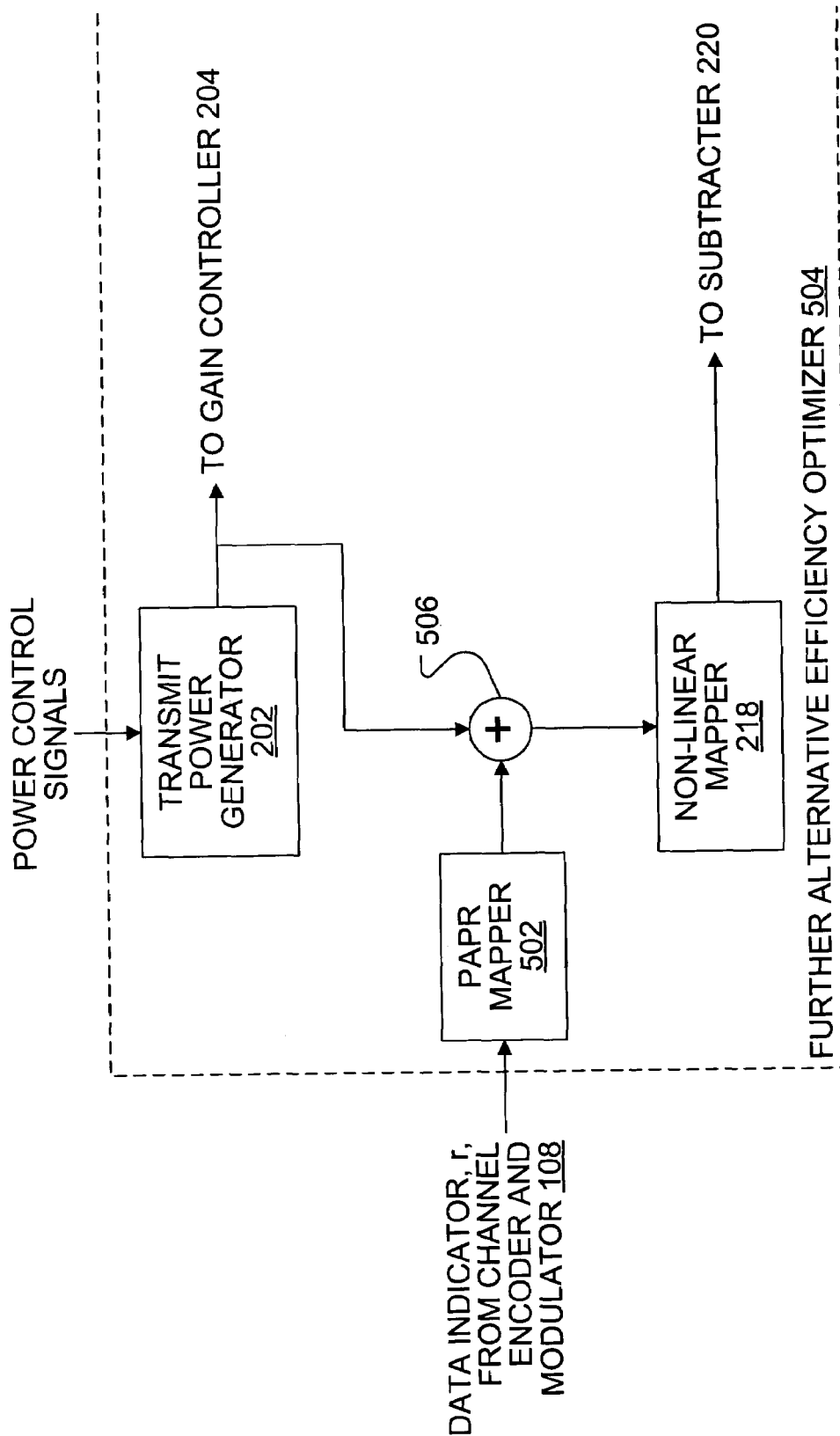
FIG. 5 illustrates an optional alteration to the apparatus of FIGS. 2 and 3.

In FIG. 5, yet another alternative embodiment, which may be applied to either the embodiment of FIG. 2 or the embodiment of FIG. 3, is illustrated. A further alternative efficiency optimizer 504 includes the transmit power generator 202 and the nonlinear mapper 218 familiar from the efficiency optimizers 104, 304 of FIGS. 2 and 3. However, rather than a direct connection between the transmit power generator 202 and the input to the nonlinear mapper 218, a transmit power summer 506 receives the output of the transmit power generator 202 and provides the nonlinear mapper 218 with the sum of the output of the transmit power generator 202 and an input signal received from a PAPR mapper 502. The PAPR mapper 502 receives a data indicator, r, from the data encoder and modulator 108 (FIG. 1). The PAPR mapper 502 includes a mapping table that relates the PAPR value of the transmitted signal of the channel encoder and modulator 108 to the data indicator r. The PAPR mapper output value is preferably in dB or proportional to dB by the same factor as that used in the output of the transmit power generator 202. Alternatively outputs of the transmit power generator 202 and the PAPR mapper 502 can be also in linear scale. If linear scale is used, the summer 506 needs to be replaced by a multiplier.

In overview, the power efficiency of the transmitter 102 is optimized through control of a selected aspect of operation of the transmitter 102, for instance, a parameter of the power amplifier 214. The control of the parameter is based, at least in part, on a generated indication of desired average transmitted power. Based on this indication, a hardware path produces an analog first adjustment signal and a corresponding digital first adjustment value and a software path produces a digital second adjustment value, where the second adjustment value has been previously determined to correspond to the particular indication of desired average transmitted power through calibration. A difference between the first adjustment value and the second adjustment value is used to produce a correction value, which is converted to a correction signal that is subsequently used to alter the first adjustment signal and produce a signal to control the selected aspect of operation of the transmitter 102.

In operation, with reference to FIG. 2, the desired average transmitted power, Tx_pwr, value is provided by the transmit power generator 202 to the gain controller 204. The transmit power generator 202 may generate the desired average transmitted power based on information provided by the receiver and communication from a base station to which the wireless communication device 100 is transmitting. It is well known that a wireless communication device may use the forward link (or down link) received signal properties from the base station to adjust for characteristics of the reverse link (or up link) wireless channel, and that base stations may further communicate power control signals to related wireless devices to adjust for characteristics of the wireless channel from the wireless device to the base station in the reverse link (or up link). Such power control methods may be related to an open loop power control method, a closed loop power control method and/or other known power control methods.

With open loop power control, the wireless device may, for instance, use a received total signal strength, a pilot signal strength to interference ratio and internal algorithms to estimate and adjust the desired average transmitted power. The average transmitted power generated using open loop power control can be further adjusted, on an effectively continuous basis, by closed loop power control signals that the wireless communication device 100 receives from the base station. These power control signals and methods are well known in the art and are not discussed further.

Since the power control of the wireless communication device 100 varies with time, the desired average transmit power, Tx_pwr, varies with time. Notably, the Tx_pwr value may vary quickly. For instance, according to the known cdma2000 standard, an update occurs (such that the transmit power generator 202 generates a new Tx_pwr value) every 1.25 ms.

The gain controller 204 may perform, but is not limited to performing, such functions as data format changing, nonlinear mapping, update rate changing, etc., and is not further detailed herein, as gain controllers are well known to the art. The output of the gain controller 204 is converted from a series of digital sample values to an analog transmitter automatic gain control, "Tx_AGC", signal by the gain D/A converter 206. The Tx_AGC signal is then provided to the AGC amplifier 208 to control the gain of the transmitter 102. The Tx_AGC signal is also provided to the optimizer scaling unit 210.

A scaled version of the Tx_AGC signal at the output of the optimizer scaling unit 210, i.e., an approximation to the desired value of the power amplifier parameter signal optimized for the particular desired average transmit power (as described hereinafter in conjunction with FIG. 7), is summed with the correction signal x at the adjustment signal summer 212 to produce the power amplifier parameter signal y. The power amplifier parameter signal y may be considered to be an improved estimate of the power amplifier parameter optimized for the particular desired average transmit power. Additionally, the power amplifier parameter signal y is converted from the analog signal at the output of the adjustment signal summer 212 to the digital signal $y_d$ by the A/D converter 216.

The nonlinear mapper 218 stores a mapping table containing desired values of $y_d$ as a function of Tx_pwr output by the transmit power generator 202. A method to determine these desired values will be provided hereinafter. While the transmitter 102 is turned on, the Tx_pwr value is sampled by the processor 230 and sent to the nonlinear mapper 218 periodically, e.g., every 20 ms, and the Tx_pwr value is used by the nonlinear mapper 218 to determine an interpolated value $y_i$.

A difference ($y_i - y_d$) between the interpolated value, $y_i$, and the sampled instantaneous value of the digital signal, $y_d$, representative of the analog power amplifier parameter signal supplied to the power amplifier 214, is determined by the subtracter 220. The difference may then be limited by the clipper 222 such that the clipped value at the output of the clipper 222 does not exceed a limit value $\pm D_{max}$. Depending the choice of value $D_{max}$, which is optimized in the design stage as will be further described hereinafter, the use of the clipper may be optional in implementing this invention. The clipper output value, which may be positive or negative, is added to the previous value already stored in the accumulator 224 to improve the value of a digital correction signal. The accumulator 224 subsequently outputs the value of the digital correction signal, which is converted to the analog correction signal x by the ACC D/A converter 228.

A recommended value for an initial value supplied by the initial value memory 226 to the accumulator 224 is the middle value of the output range of the ACC D/A converter 228. A characterized value that is obtained as the measured mean value of the correction signal x that is subsequently averaged over a number of devices may also be stored by the initial value memory 226 for use as the initial value.

During transmission, continuous changes in the Tx_AGC signal, generated from the Tx_pwr signal that was generated according to open loop and/or closed loop power control, lead to continuous adjustments to the power transmitted at the antenna 106. Meanwhile, changes in the Tx_AGC signal lead to changes in the power amplifier parameter signal y that is intended to optimize the power efficiency. At any given Tx_pwr value, a feedback path reports the applied power amplifier parameter signal y through the A/D 216. The reported value, $y_d$, is compared with a pre-stored interpolated value, $y_i$, determined by the nonlinear mapper 218 at the given Tx_pwr value. If the difference between the reported value and the interpolated value is determined to be zero, the power amplifier parameter signal y applied is considered to be optimal and it is determined that no correction is required. However, if the difference is not zero, the difference is used to produce the correction signal x to correct the power amplifier parameter signal y and the iteration continues to try to make the difference reduced until the difference is zero.

Notably, the determination of the necessity and degree of correction by the nonlinear mapper 218, the subtractor 220, the clipper 222 and the accumulator 224 may be implemented in software running on a microprocessor. As such, these components are illustrated in FIGS. 2 and 3 as encompassed by a processor 230.

After a quick change in desired transmit power, the signal converter (e.g., the optimizer scaling unit 210), which is implemented in hardware, may quickly produce an approximation to the desired power amplifier parameter value at the signal y corresponding to the new transmit power. The nonlinear mapper 218 may then, after a delay, produce a desired value, $y_i$, for the power amplifier parameter signal y corresponding to the new transmit power. As the value $y_i$ produced by the nonlinear mapper 218 is generally more accurate than the approximation produced by the signal converter, the hardware and software aspects of the efficiency optimizer 104 may be seen to each have a strength. The hardware aspect having a strength in response speed and the software aspect having a strength in accuracy.

Figure 6:
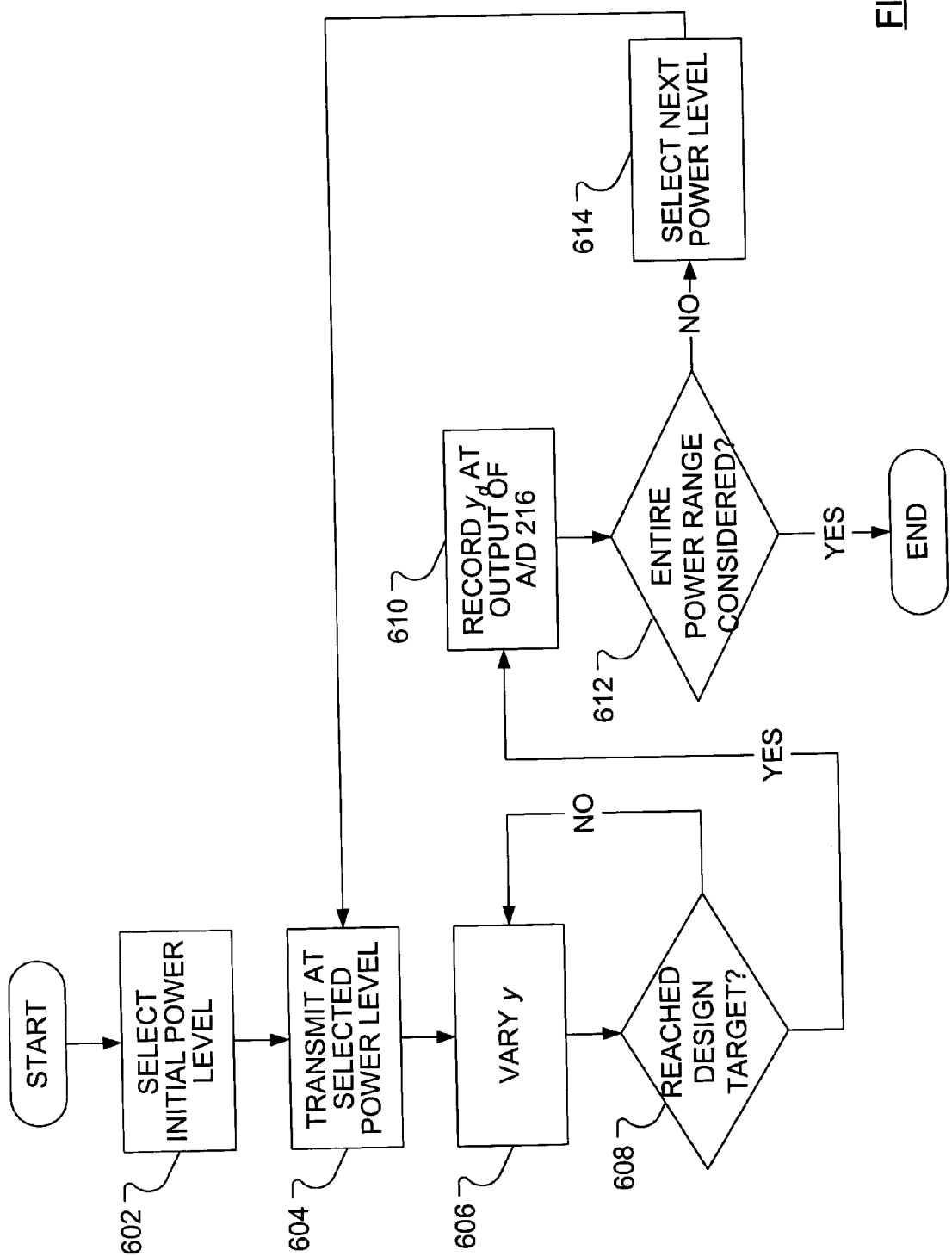
FIG. 6 illustrates steps in a method of determining a mapper component of the apparatus of FIGS. 2 and 3.

The values of the look up table in the nonlinear mapper 218 are optimized by characterizing several sample devices during a design stage, as illustrated in FIG. 6. Initially, a power level is selected (step 602). Transmission is then performed, at the wireless communication device 100, at the selected power level (step 604). The selected power level is held constant by controlling the value of Tx_AGC at the gain D/A 206 while monitoring out of band spurious emissions at the output of the power amplifier 214. While continuing to monitor the out of band spurious emissions at the output of the power amplifier 214, the power amplifier parameter signal y is varied (step 606) until it is determined (step 608) that the out of band spurious emissions are at or near a predetermined design target for such emissions. The power amplifier parameter signal y may be varied (step 606) by adjusting the value of the correction signal x at the ACC D/A 228 while maintaining a constant output power, which may require re-adjusting the Tx_AGC value. Once the out of band spurious emissions have reached the target value, the value $y_d$, i.e., the digital value of the analog power amplifier parameter signal y, may be recorded (step 610).

The digital value, $y_d$, of the analog power amplifier parameter signal y, may be noted for a range of power levels. Characterization parameters, such as a minimum and maximum power level that define the range of power levels and a power level increment, may be defined before commencing such characterization.

Once the digital value of the analog power amplifier parameter y, has been recorded (step 610) in association with the initial power level, it is determined whether the entire range of power levels has been considered. (step 612). If it is determined that the entire range of power levels has not been considered, the next power level in the range is selected (step 614), typically, by adding the power level increment to the previous power level. Transmission (step 604) at this next power level is then commenced with the further steps (steps 606-612) taken to determine and record the digital value of the analog power amplifier parameter signal y for which the out of band spurious emissions are at or near a predetermined design target.

When the entire power level range has been considered for a first sample device, the method of FIG. 6 is repeated for several more sample devices. When the entire power level range has been considered for a set of sample devices, a mapping table is compiled including averages (averaging over the set of sample devices characterized) of the noted values of $y_d$ as a function of Tx power. The mapping table is stored in the nonlinear mapper 218.

The relationship, stored in the nonlinear mapper 218, between Tx_pwr and $y_i$, may be considered to represent a curve. For a given Tx_pwr value, values for the power amplifier parameter on one side of the curve lead to out of band spurious emissions that are greater than the predetermined design target for such emissions, and values on the other side of the curve are less than the predetermined design target.

Figure 7:
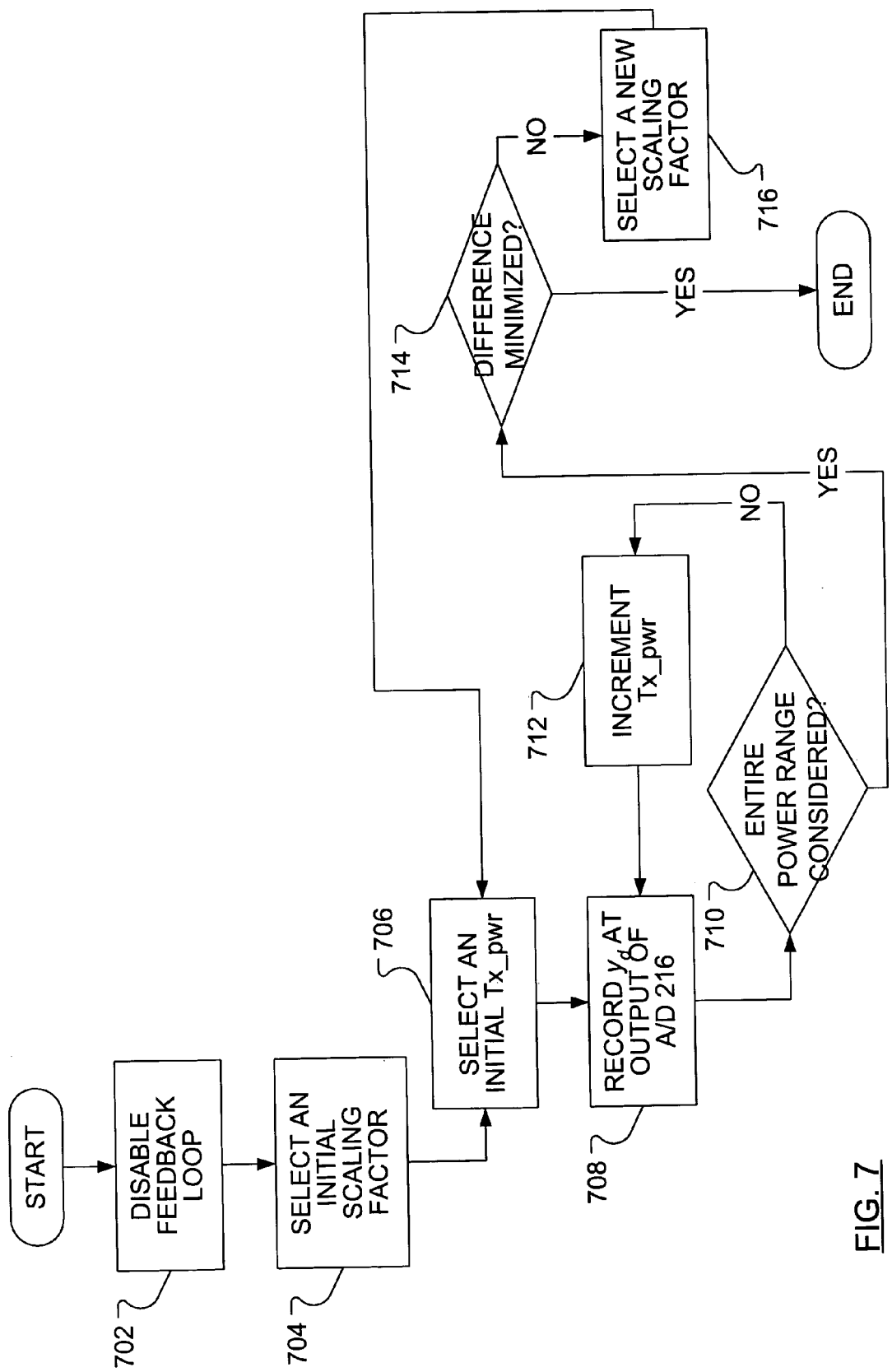
FIG. 7 illustrates steps in a method of determining parameter or parameters of the optimizer scaling unit of FIG. 2, or the piecewise clipper of FIG. 3.

The optimizer scaling unit 210 is characterized by a scaling factor S, which may be optimized by characterizing several devices as illustrated in FIG. 7. Initially, the feedback loop, which provides the correction signal x, is disabled (step 702) so that the value of the power amplifier parameter signal y is completely determined by the optimizer scaling unit 210. The feedback loop may be disabled by providing a constant value to the ACC D/A 228 that equals to the initial value used in the initial value memory 226. An initially guessed value of scaling factor S is then selected (step 704) followed by the selection of an initial Tx_pwr value (step 706). The value $y_d$, i.e., the digital value of the analog power amplifier parameter y, is then recorded (step 708) in association with the selected Tx_pwr value. The value of the transmit power output from the power amplifier 214 is also recorded and it is then determined (step 710) whether the entire output power range of the device has been considered.

If the entire output power range of the device has not been considered, the Tx_pwr value is incremented (step 712) and the values of $y_d$ and Tx_pwr are again recorded (step 708). If the entire output power range of the device has been considered, a table of digital values determined for the power amplifier parameter signal y associated with Tx_pwr values is compared to the similar table created when optimizing the entries in the look up table for the linear mapper 218.

It is then determined (step 714) whether the difference between these tables has been minimized by the selection of the scaling factor. If the difference has not been minimized, a new scaling factor is selected (step 716), based on the difference between the tables, and the creation of a table associating the power amplifier parameter to the Tx_pwr value (steps 706, 708, 710, 712) is repeated. If the difference has been minimized, the method is considered to be complete and the scaling factor that minimizes the difference is considered to be the optimal scaling factor for this particular device.

When the entire power level range has been considered for a first sample device, the method of FIG. 7 may be repeated for several more sample devices. The least aggressive scaling factor from the resulting optimal scaling factors is then selected for use in the optimizer scaling unit 210 in order to implement a product employing aspects of the present invention.

The clipping value, $D_{max}$, of the clipper 222 may be chosen based on the update speed and the control sensitivity to the power amplifier parameter. The clipping value should be chosen to ensure stability of the feedback loop while providing satisfactory tracking speed. Those skilled in the art should be able to devise a method to optimize the clipping value. If the determined optimal value of $D_{max}$ in a given design is so large that effectively no clipping is performed to the signal, the clipper 222 is not used and the input is straight to its output.

In the embodiment described hereinbefore with reference to FIG. 2, the gain controller 204 and the optimizer scaling unit 210 provide a "fast hardware adjustment", which approximates the desired relationship between the desired transmit power, Tx_pwr, and the power amplifier parameter signal, y, as a linear function of the transmitter automatic gain control signal, Tx_AGC. It may be shown that the ideal function is, instead, nonlinear.

In an alternate embodiment, described hereinafter, a piecewise linear approximation to the ideal nonlinear function is provided by altering the output of the gain controller 204. In the alternative efficiency optimizer 304, illustrated in FIG. 3, the majority of components are shared with the efficiency optimizer 104 of FIG. 2. However, the signal converter is the piecewise clipper 310. One exemplary input to output transfer function of the piecewise clipper 310 is illustrated in FIG. 4.

In this alternate embodiment, the values of the look up table in the nonlinear mapper 218 are produced in the same way as described above.

The parameters of the piecewise clipper 310 can be optimized using the method having essentially the same structure as the method of FIG. 7. In this case, several parameters are required to be chosen to best fit the relation of Tx_pwr vs. $y_d$ to the desired relation (namely the relation of Tx_pwr vs. $y_i$ as stored in the nonlinear mapper 218).

Initially, the feedback loop is disabled (step 702). The feedback loop may be disabled by providing a constant value to the ACC D/A 228 that equals to the initial value used in the initial value memory 226. A set of initial values are selected for the parameters of piecewise clipper 310, such as those shown in FIG. 4 (step 704). An initial Tx_pwr value is then selected (step 706). The value $y_d$, i.e., the digital value of the analog power amplifier parameter y, is then recorded (step 708) in association with the selected Tx_pwr value. The value of the transmit power output from the power amplifier 214 is also recorded and it is then determined (step 710) whether the entire output power range of the device has been considered.

If the entire output power range of the device has not been considered, the Tx_pwr value is incremented (step 712) and the values of $y_d$ and Tx_pwr are again recorded (step 708). If the entire output power range of the device has been considered, a table of digital values determined for the power amplifier parameter signal y associated with Tx_pwr values is compared to the similar table created when optimizing the entries in the look up table for the linear mapper 218.

It is then determined (step 714) whether the difference between these tables has been minimized by the selection of the parameters of the piecewise clipper 310. If the difference has not been minimized, a new set of parameters may be selected (step 716), based on the difference between the tables, and the creation of a table associating the power amplifier parameter to the Tx_pwr value (steps 706, 708, 710, 712) is repeated. If the difference has been minimized, the method is considered to be complete and the values of the set of parameters that minimize the difference is considered to be the optimal set of parameter values for the piecewise clipper 310 for this particular device.

When the entire power level range has been considered for a first sample device, the method of FIG. 7 may be repeated for several more sample devices. An optimal set of parameter values can then be obtained by choosing the least aggressive values among the individually optimal values of the characterized devices, for use in implementing a product employing aspects of the present invention.

FIG. 5 illustrates yet another embodiment, which works with either of the two embodiments described above, the output of the transmit power generator 202 is fed to the nonlinear mapper 218 via a transmit power summer 506. The data encoder and modulator 108 (FIG. 1) generates a data format/data rate indicator that uniquely indicates a supported combination of data rate, coding and modulation method of the wireless communication device 100, referred to herein as a data indicator "r". The data indicator, r, which may provide an indication of a data rate and/or data format for the currently transmitted signal, is received by the PAPR mapper 502 so that the output of the PAPR mapper 502 is the PAPR (peak to average power ratio) of a data signal having the data rate and/or data format corresponding to the data indicator, r. The output from the PAPR mapper may be expressed in dB or may be expressed in a value that is proportional to the PAPR value in dB of the data format indicated by the data indicator, r, and has the same scale factor as that of the Tx_pwr value. The transmit power summer 506 adds the Tx_pwr value and the PAPR(r) value to generate a peak power value for the currently transmitted data signal. This peak power value is provided to the nonlinear mapper 218. In this embodiment, the nonlinear mapper 218 is preconfigured to store the ideal power amplifier parameter value as a function of peak power instead of the average power Tx_pwr, as presented hereinbefore.

In yet another alternative embodiment, the "initial value" supplied by the initial value memory 226, rather than being pre-set as the middle value of the output range of the ACC D/A 228, may be an improved initial value $x_i$ determined through self-calibration, referred to hereinafter as a self-calibrated initial value. The self-calibration method may be carried out as follows.

At time of manufacturing, an initial value for the self-calibrated initial value $x_i$ is stored in the initial value memory 226, where the initial value may be, as discussed hereinbefore, a predetermined value such as the middle value of the range of the ACC D/A 228, or a characterized value obtained by measuring the mean value of the correction signal x and averaging the mean over a number of devices. The wireless communication device 100 may initiate a call. The first time the wireless communication device 100 transmits, the pre-stored value of the self-calibrated initial value $x_i$ is used. The value x is periodically sampled during transmission. At the time the call finished, the sampled values are averaged and the mean value, denoted as $x_m$, may be calculated. The self-calibrated initial value $x_i$ may then be updated as $$x_i(\text{new}) = x_i(\text{old}) + \alpha g(x_m - x_i(\text{old}))$$

where $\alpha$ is a small positive quantity.

The method for updating the self-calibrated initial value may be performed every time a call completes. It is considered that the improved initial value $x_i$ will provide a good initial guess for x for each call. Additionally, the self-calibrated initial value can be used for a device diagnostic purpose in that, after a period of self calibration, if a given device has converged to an self-calibrated initial value $x_i$ that is far away from the self-calibrated initial value of other similarly manufactured devices, the given device may be considered to have a problem.

Other modifications will be apparent to those skilled in the art and, therefore, the invention is defined in the claims.

We claim:

1. An efficiency optimizing apparatus for optimizing power efficiency in a transmitter, said efficiency optimizing apparatus comprising:
    a transmit power generator operable to produce an indication of desired average transmitted power;
    a signal converter operable to produce a first adjustment signal based, at least in part, on said indication of desired average transmitted power;
    a processor operable to:
        produce a second adjustment signal based, at least in part, on said indication of desired average transmitted power;
        determine a difference between said first adjustment signal and said second adjustment signal; and
        produce a correction value based on said difference; and
    a summer operable to produce a parameter signal, based on said correction value and said first adjustment signal, to control an aspect of operation of said transmitter.

2. The efficiency optimizing apparatus of claim 1 wherein said aspect of operation of said transmitter is an aspect of operation of a power amplifier of said transmitter.

3. The efficiency optimizing apparatus of claim 1 further comprising a gain controller operable to produce a gain control signal based on said indication of desired average transmitted power and where said signal converter is operable to produce said first adjustment signal based on said gain control signal.

4. The efficiency optimizing apparatus of claim 3 wherein said signal converter is a scaling unit operable to scale said gain control signal to produce said first adjustment signal.

5. The efficiency optimizing apparatus of claim 3 wherein said signal converter is a piecewise clipper operable to:
    process said gain control signal according to a transfer function defined by at least one clipping parameter to produce said first adjustment signal;
    where said transfer function includes at least one range of clipping values of said gain control signal for which said first adjustment signal is constant;
    where said transfer function includes at least one range of scaling values of said gain control signal for which said first adjustment signal is a scaled version of said gain control; and
    wherein said transfer function is a continuous function.

6. The efficiency optimizing apparatus of claim 1 wherein said processor employs:
    a mapping procedure to produce said second adjustment signal by determining an ideal adjustment signal corresponding, in a mapping table, to said indication of desired average transmitted power;
    a subtracting procedure to determine said difference between said first adjustment signal and said ideal adjustment signal; and
    an accumulating procedure to add said difference to a previously existing value to produce said correction value.

7. The efficiency optimizing apparatus of claim 6 further employing a clipping procedure to limit said difference such that said difference does not exceed a limit value.

8. The efficiency optimizing apparatus of claim 6 further comprising:
    an initial value memory adapted to supply an initial value to said accumulating procedure; and
    a digital to analog converter, having an output range, for convening said correction value to a correction signal.

9. The efficiency optimizing apparatus of claim 8 wherein said initial value is a middle value in said output range of said digital to analog converter.

10. The efficiency optimizing apparatus of claim 8 wherein said initial value is a mean value of said correction signal.

11. The efficiency optimizing apparatus of claim 10 where said mean value is determined through measuring and averaging said correction signal over a number of similar efficiency optimizing apparatus.

12. The efficiency optimizing apparatus of claim 10 where said mean value is determined through measuring said correction signal over a previous period of transmission.

13. The efficiency optimizing apparatus of claim 1 further comprising:
    a mapper operable to receive a data indicator and, based on said data indicator, produce a value representative of a peak power to average power ratio; and
    a summer operable to produce a sum of said value and said indication of desired average transmitted power;
    wherein said processor is operable to produce said second adjustment signal based on said sum.

14. The efficiency optimizing apparatus of claim 1 wherein said signal converter is a hard wired device.

15. A method of optimizing power efficiency in a transmitter, said method comprising:
    generating an indication of desired average transmitted power;
    based on said indication of desired average transmitted power, producing a first adjustment signal;
    based on said indication of desired average transmitted power, producing a second adjustment value;
    determining a difference between a first adjustment value based on said first adjustment signal and said second adjustment value;
    based on said difference, producing a correction value; and
    based on said correction value and said first adjustment signal, producing a parameter signal to control an aspect of operation of said transmitter.

16. The method of claim 15 wherein said aspect of operation of said transmitter is an aspect of operation of a power amplifier of said transmitter.

17. The method of claim 15 wherein said transmitter includes a gain controlled amplifier and said method further comprises:
- based on said indication of desired average transmitted power, producing a gain control signal for said gain controlled amplifier; and
- based on said gain control signal, producing said first adjustment signal.

18. The method of claim 15 further comprising producing said second adjustment value by determining an ideal adjustment value corresponding, in a mapping table, to said indication of desired average transmitted power.

19. The method of claim 15 wherein said producing said second adjustment value further comprises:
- producing an indication of desired peak transmitted power by summing said indication of desired average transmitted power with an indication of peak to average power ratio; and
- based on said indication of desired peak transmitted power, producing said second adjustment value.

20. The method of claim 15 further comprising:
- converting said correction value to a correction signal; and
- based on said correction signal and said first adjustment signal, producing said parameter signal to control said aspect of operation of said transmitter.

* * * * *